April 20, 1965
E. G. HINZIE
3,179,468
LEG REST FOR MOTOR VEHICLE OPERATOR
Filed June 14, 1963
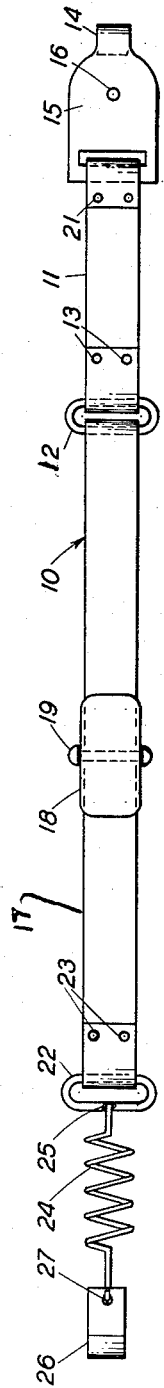
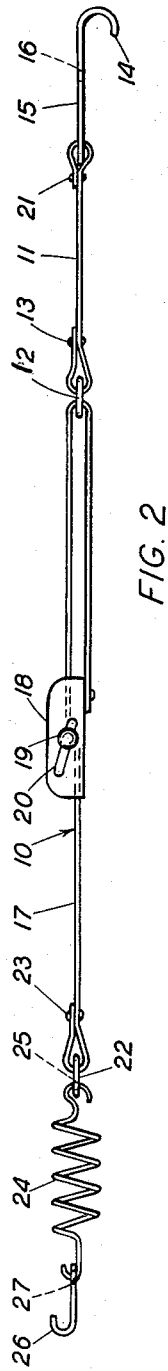
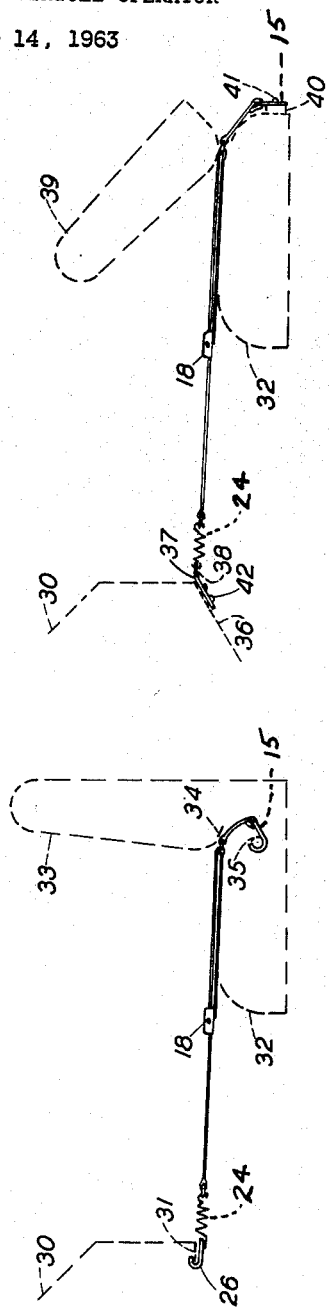
EARL G. HINZIE  INVENTOR.
BY George R Nimmer
     Atty.

United States Patent Office 3,179,468
Patented Apr. 20, 1965

3,179,468
LEG REST FOR MOTOR VEHICLE OPERATOR
Earl G. Hinzie, 5502 S. 75th St., Ralston, Nebr.
Filed June 14, 1963, Ser. No. 287,970
2 Claims. (Cl. 297—427)

This invention relates to an automobile leg rest. In particular, this invention relates to a leg support device for operators of motor vehicles.

When operating a motor vehicle, it is at least occasionally necessary to change the speed of the vehicle by stepping on the brake or the accelerator pedal and otherwise controlling the vehicle involved by various maneuvers requiring the use of the right leg. Normally, however, it is necessary to hold the leg tensely erect ready at a moment's notice for placing the foot upon the accelerator or brake pedal, as already mentioned, but such tensely erect position of the leg held for any considerable length of time is very fatiguing. This is emphatically true if it is attempted to drive long distances, and then the fatigue becomes so acute that the distance traveled is virtually limited to that which the right leg can tolerate without becoming over-fatigued to the actual point of suffering pain.

Each of the prior art devices for supporting the right leg of the motor vehicle operator possesses one or more of the following disadvantages:

(1) Some are difficult and expensive to install in a motor vehicle, requiring expert personnel and professional equipment for installation of the leg support device into the chassis or floor board of the motor vehicle.
(2) Others are difficult to remove after being once installed. A leg support device being primarily employed for long distance driving, it is oftentimes desired to remove the device for short trips, e.g. intracity driving.
(3) Few leg support devices of the prior art are adjustable to the anatomical peculiarities of the particular vehicle operator. Most of those that are adjustable are not readily readjustable to alternate positions for the same or a substitute vehicle operator.
(4) Many prior art devices bear so rigidly against the leg so as to cause pain and discomfort to the operator.

It is, therefore, an object of the present invention to provide a leg support device for a motor vehicle operator that is easy and inexpensive to manufacture and install into the automobile's operator compartment.

It is another object of the present invention to provide a leg support device that may simply and readily be removed from the operator compartment for short trips and intracity driving.

It is yet another object of the present invention to provide a leg support device that is laterally resiliently deflectable so as not to cause pain and discomfort to the motor vehicle operator.

It is yet another object of the present invention to provide a leg support device that is readily readjustable to alternate positions for the same or a substitute vehicle operator.

These and other objects and advantages are attained by means of an adjustably-elongate strap-like device having a hook terminus, said device supporting the right leg of an automobile operator, said strap-like device providing a longitudinally fixed yet laterally resiliently deflectable bridge between a forward position of the automobile's operator compartment and a lower rear position of the horizontal front seat cushion.

In the drawing:

FIGURE 1 illustrates a top plan view of a leg support device of the present invention.

FIGURE 2 is a side elevation view of the leg support device of FIGURE 1.

FIGURE 3 illustrates the leg support device of FIGURES 1 and 2 installed in the operator's compartment of an automobile having a folded-lip type dashboard and a stationary upright front seat cushion.

FIGURE 4 illustrates the leg support device of FIGURES 1 and 2 installed in the operator's compartment of an automobile having a dashboard of smooth regular configuration and a pivotal upright front seat cushion.

It can be seen from FIGURES 1 and 2 that the leg support device 10 comprises an elongate rearward strap section 11 as a single length of belting material, one end of which is looped through and securely holds a fastening device 15 with the aid of rivets 21. Fastening device 15 includes a rigid inflexible hook 14, the shank of which is broader than the hook and includes a perforation 16. The other end of rearward strap section 11 is looped through and securely holds an oval connecting ring 12 with the aid of rivets 13. The forward section of leg support device 10 includes a forward flexible strap section 17 that is loosely looped through oval connecting ring 12. "Flexibility" is defined in this patent application to mean "hand-bendable by a typical human male." Forward strap section 17 is longitudinally, i.e. lengthwise, adjustable by means of an army-type belt buckle 18 secured to one end of forward strap section 17, the same forward strap section passing through the buckle 18. The adjusted length of forward strap section 17 is maintained by buckle pin 19 which slides in the buckle angular slot 20 against forward strap section 17. Forward strap section 17, together with buckle 18 and its buckle pin 19 is conveniently provided by means of a conventional army trouser belt and buckle, the trouser belt being cut to a convenient length.

The other end of forward strap section 17 is looped through, and with the aid of rivets 23, securely holds a perforated oval connecting ring 22, one side of which includes perforation 25. One end of a longitudinally resiliently distensible tubular-shaped coil spring 24 is securely attached through perforation 25. The terminus of leg support device 10 is provided with a hook 26 that is securely attached to the other end of coil spring 24, as by means of perforation 27.

Installation of the adjustably-elongate leg support device 10 is illustrated in FIGURES 3 and 4. There are two ways in which the fastening device 15 can be fastened to a lower rear position of the horizontal seat cushion 32 depending upon whether the upright seat cushion is stationary, as is the case generally in 4-door automobiles, or pivotal, as in the case generally with 2-door automobiles. In addition, there are at least two ways in which the hook terminus, e.g. 26, of leg support device 10 can be attached to a forward position of the operator's compartment depending, for example, whether or not said forward position is adapted to engage a hook, e.g. 26. These two possibilities are exemplified, in the case of dashboards, by the folded-lip type and by the smooth regular configuration type.

From FIGURE 3, it can be seen that leg support device 10 provides a bridge of fixed length between a dashboard 30 having a folded lower lip 31 and an upholstery rod 35 of horizontal seat cushion 32. Terminus hook 26 that is attached to coil spring 24 securely engages folded lip 31. Hook 14 of fastening device 15 securely engages an upholstery rod 35, that is a conventional part of the underside framework of horizontal automobile seat cushions. It can be seen, further, that the rearward strap section 11 passes into the juncture 34 of stationary upright cushion 33 and horizontal seat cushion 32 and is in tight contact with the top surface of horizontal seat cushion 32.

In the case of a dashboard 30, having a bottom 36 of smooth regular configuration, as shown in FIGURE 4, it is necessary to provide a mounting bracket for engagement by a hook, e.g. 26. Conveniently, this bracket may take the form of a strip of metal 37 having a perforation 38, said strip being attached to the smooth bottom 36 as by means of screws 42. In the case of pivotal upright seat cushions 39, access to the rods in the upholstery framework is generally impossible without cutting into the horizontal seat cushion fabric. However, when pivotal upright seat cushions are employed, there is usually a hard upright facing plate 40 at the rearward base of the horizontal seat cushion. In such cases, the hook 14 of fastening device 15 is flattened or removed, and the fastening device is conveniently attached to the facing plate 40 by means of a screw 41 passing through perforation 16.

Thus, in whatever manner the leg support device 10 is attached between a forward position of the automobile's operator compartment and a lower rear position of the horizontal seat cushion 32, the leg support device provides a bridge of fixed length between the two. Moreover, because the coil spring is longitudinally resiliently distensible, the leg support device provides a laterally resiliently deflectable support for the operator's right leg and relieves the tedium of the automobile operation.

Even though a length of the rearward strap section 11 enters juncture 34 and is, therefore, squeezed between the horizontal seat cushion 32 and the upright seat cushion, the leg support device is nevertheless readily longitudinally adjustable since the forward strap section 17 is independently adjustable of rear strap section 11.

Although other means are available to render the forward section longitudinally resiliently distensible, e.g. an elastic strap, the coil spring embodiment is preferred because it will lend rotatability to the leg support device and, further, facilitates itself to attachment of the hook terminus. If the coil spring embodiment is to be employed, it is desirable to shield the coil spring by means of a cylindrical tube so as to prevent snagging of the operator's clothing.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

Having thus completely and fully described the invention what is now claimed as new is as follows:

1. An adjustably-elongate generally-flexible leg support device for a motor vehicle operator, said leg support device being adapted to provide a longitudinally fixed yet laterally resiliently deflectable bridge between a forward position of the motor vehicle's operator compartment and a lower rear position of the horizontal front seat cushion, said adjustably-elongate leg support device comprising:
   (A) a flexible elongate rearward strap section having securely attached to an end thereof a rigid inflexible hook, the shank of which is multi-perforate, the other end of said rearward strap section being securely looped through a connecting ring, and
   (B) an adjustably-elongate forward section that is longitudinally resiliently distensible, said forward section comprising in order:
      (i) a flexible adjustably-elongate forward strap section, one end being securely looped through said connecting ring, said forward strap section being provided with a slotted buckle having a slidable buckle pin, so as to maintain the adjusted length of the forward strap section,
      (ii) a longitudinally resiliently distensible tubular-shaped coil spring that is securely attached to said forward strap section, said coil spring being attached to and surrounded by a cylindrical tube shield and
      (iii) a rigid hook securely attached to said coil spring, said hook forming a terminus of said leg support device.

2. In combination with a motor vehicle's operator compartment, an adjustably-elongate leg support device for the motor vehicle operator, said leg support device providing a laterally resiliently deflectable bridge of fixed length between a forward position of the motor vehicle's operator compartment and a lower rear position of the horizontal front seat cushion, said leg support device comprising:
   (A) an elongate rearward strap section one end thereof being securely fastened to a lower rear position of the horizontal front seat cushion, a length of said rearward strap section being in firm contact with the top surface of said horizontal front seat cushion and entering the juncture between the horizontal and upright seat cushions, and
   (B) an adjustably-elongate forward section that is longitudinally resiliently distensible, said forward section comprising in order:
      (i) a flexible adjustably-elongate forward strap section, one end being securely attached to said rearward strap section, said forward strap section being provided with locking means so as to maintain the adjusted length of the forward strap section,
      (ii) a longitudinally resiliently distensible tubular-shaped coil spring that is securely attached to said forward strap section, and
      (iii) a rigid hook securely attached to said coil spring, said hook being securely engaged with a forward position of the motor vehicle's operator compartment.

References Cited by the Examiner

UNITED STATES PATENTS

| | | | |
|---|---|---|---|
| 2,225,818 | 12/40 | Brooks | 297—427 |
| 2,585,398 | 2/52 | McIlwrath | 297—427 |
| 2,650,654 | 9/53 | Twiford | 297—427 |
| 2,701,605 | 2/55 | Belmont | 297—427 |
| 2,898,976 | 8/59 | Barecki | 280—150 |

FRANK B. SHERRY, *Primary Examiner.*